United States Patent
Forbes et al.

(10) Patent No.: US 12,313,214 B2
(45) Date of Patent: *May 27, 2025

(54) FORMABLE STAND SYSTEM

(71) Applicant: FORBES REHAB SERVICES, INC., Mansfield, OH (US)

(72) Inventors: Paul Wilbur Forbes, Lexington, OH (US); Clayton Prescan Smeltz, Mansfield, OH (US)

(73) Assignee: FORBES REHAB SERVICES, INC.

( * ) Notice: Subject to any disclaimer, the term of this patent is extended or adjusted under 35 U.S.C. 154(b) by 0 days.

This patent is subject to a terminal disclaimer.

(21) Appl. No.: 17/099,795

(22) Filed: Nov. 17, 2020

(65) Prior Publication Data

US 2021/0071809 A1    Mar. 11, 2021

Related U.S. Application Data

(63) Continuation of application No. 16/150,660, filed on Oct. 3, 2018, now Pat. No. 10,837,596, which is a
(Continued)

(51) Int. Cl.
*F16M 11/40* (2006.01)
*F16M 11/10* (2006.01)
(Continued)

(52) U.S. Cl.
CPC ............ *F16M 13/00* (2013.01); *F16M 11/10* (2013.01); *F16M 11/105* (2013.01);
(Continued)

(58) Field of Classification Search
CPC .......................... F16M 11/40; A47B 2023/045
(Continued)

(56) References Cited

U.S. PATENT DOCUMENTS

| 328,740 A | 10/1885 | Wiederer |
|---|---|---|
| D118,443 S | 1/1940 | Fisk et al. |

(Continued)

FOREIGN PATENT DOCUMENTS

EP    1795134    6/2007

OTHER PUBLICATIONS

Corrected Notice of Allowability dated May 27, 2021 for U.S. Appl. No. 29/726,057 (pp. 1-2).
(Continued)

*Primary Examiner* — Bradley Duckworth
(74) *Attorney, Agent, or Firm* — McDonald Hopkins LLC

(57) ABSTRACT

A formable support stand system for portable electronic devices that provides a manner to support a device such as a tablet computer in a variety of orientations from a supporting surface such as a tray or table. The embodiments comprise a flex-rod prop, and a fastener for attaching the prop to an electronic device, such that the flex rod resists deformation, but can be adjusted into a wide variety of positions. The stand system is adapted for use with devices used by those with limited or erratic motor control, in order to allow positioning of the screen face of a tablet computer in a chosen orientation relative to a support tray on a wheelchair, for instance. The stand system comprises a flexible, positionable flex-rod, an anti-skid sleeve and is removeably attached to the electronic device by means of rod clamp system. The formable support system is also provided as a kit for retrofitting existing devices.

20 Claims, 3 Drawing Sheets

Related U.S. Application Data continuation of application No. 12/206,397, filed on Sep. 8, 2008, now abandoned.

(60) Provisional application No. 60/967,660, filed on Sep. 6, 2007.

(51) Int. Cl.
  *F16M 13/00* (2006.01)
  *G06F 1/16* (2006.01)

(52) U.S. Cl.
  CPC ........... *F16M 11/40* (2013.01); *G06F 1/1601* (2013.01); *G06F 1/1626* (2013.01); *G06F 1/166* (2013.01); *F16M 2200/08* (2013.01); *G06F 2200/1612* (2013.01)

(58) Field of Classification Search
  USPC ................... 248/548, 549, 470, 471, 160
  See application file for complete search history.

(56) References Cited

U.S. PATENT DOCUMENTS

| | | | | |
|---|---|---|---|---|
| 2,388,567 A * | 11/1945 | Patterson, Jr. | ......... | F16M 11/10 455/351 |
| 2,510,198 A * | 6/1950 | Tesmer | .................. | F16M 11/40 248/229.25 |
| 2,684,822 A * | 7/1954 | Odin | ...................... | F16M 11/08 248/179.1 |
| 3,351,312 A * | 11/1967 | Ballas | .................. | A47B 23/007 248/448 |
| 3,430,903 A * | 3/1969 | Gunther | .................... | F16L 3/10 248/68.1 |
| 3,924,775 A | 12/1975 | Andreaggi | | |
| 4,069,995 A | 1/1978 | Miller | | |
| D278,354 S | 4/1985 | Mahowald | | |
| D279,482 S | 7/1985 | Ermanski | | |
| 5,100,098 A | 3/1992 | Hawkins | | |
| 5,114,110 A * | 5/1992 | Vohora | ................. | A47B 23/043 248/160 |
| 5,167,394 A | 12/1992 | Hegarty | | |
| 5,223,675 A | 6/1993 | Taft | | |
| 5,235,495 A | 8/1993 | Blair | | |
| 5,276,596 A * | 1/1994 | Krenzel | ................. | F16M 11/40 362/191 |
| D359,399 S | 6/1995 | Rath | | |
| 5,503,361 A | 4/1996 | Kan-O | | |
| 5,702,175 A * | 12/1997 | Chen | ...................... | F21V 21/08 362/184 |
| D390,209 S | 2/1998 | Dials et al. | | |
| 5,752,807 A | 5/1998 | Erbes | | |
| 5,794,897 A * | 8/1998 | Jobin | ...................... | H02G 7/053 24/459 |
| 5,823,657 A * | 10/1998 | Price | ...................... | F16M 13/02 362/191 |
| 5,899,421 A | 5/1999 | Silverman | | |
| 5,915,661 A | 6/1999 | Silverman | | |
| 5,918,907 A | 7/1999 | Ho | | |
| 5,961,264 A | 10/1999 | Postadan | | |
| 6,045,179 A | 4/2000 | Harrison | | |
| D427,572 S | 7/2000 | Solomon | | |
| 6,173,725 B1 * | 1/2001 | Garth | ...................... | A47C 7/66 135/117 |
| 6,301,101 B1 | 10/2001 | Anzai | | |
| 6,318,941 B1 | 11/2001 | Guenther | | |
| 6,327,982 B1 | 12/2001 | Jackson | | |
| 6,540,184 B2 * | 4/2003 | Thaxton | .................. | B60R 11/00 248/160 |
| 6,545,864 B2 | 4/2003 | Davis, IV | | |
| D481,038 S | 10/2003 | Borsboom | | |
| D483,767 S | 12/2003 | Green | | |
| 6,718,136 B2 * | 4/2004 | Bird | ........................ | F21V 21/32 362/191 |
| D491,943 S | 6/2004 | Whitehorn | | |
| D508,055 S | 8/2005 | Lo | | |
| 6,980,426 B2 | 12/2005 | Kim | | |
| D516,415 S | 3/2006 | Friedline | | |
| D528,086 S | 9/2006 | Chia | | |
| D533,558 S | 12/2006 | Elkhuizen | | |
| 7,149,080 B2 * | 12/2006 | Jackson, Jr. | ............... | G06F 1/16 361/679.21 |
| D537,420 S | 2/2007 | Tsai | | |
| 7,180,731 B2 | 2/2007 | Titzler | | |
| 7,209,344 B2 * | 4/2007 | Hillman | ................. | F16M 11/08 248/917 |
| 7,219,700 B2 * | 5/2007 | Matsuyama | ............ | F16L 11/14 138/114 |
| D620,012 S | 7/2010 | Chen et al. | | |
| 7,798,452 B1 * | 9/2010 | Wessells | ................. | F16M 13/02 248/163.1 |
| D645,867 S | 9/2011 | Wong | | |
| D677,262 S | 3/2013 | Lewis | | |
| D677,670 S | 3/2013 | Damien | | |
| D681,714 S | 5/2013 | Lin | | |
| 8,616,422 B2 * | 12/2013 | Adelman | ................... | A45F 5/02 224/191 |
| D699,713 S | 2/2014 | Seong | | |
| D701,212 S | 3/2014 | Blevins | | |
| 8,806,723 B2 * | 8/2014 | Martinson | .............. | B65D 63/00 24/343 |
| 9,174,781 B2 * | 11/2015 | Case | ...................... | B62J 11/00 |
| 10,837,596 B2 | 11/2020 | Forbes | | |
| D903,651 S | 12/2020 | Prince | | |
| D971,203 S | 11/2022 | Zheng | | |
| 2003/0089832 A1 | 5/2003 | Gold | | |
| 2004/0233623 A1 * | 11/2004 | Hillman | .............. | F16M 11/2014 361/679.06 |
| 2005/0092877 A1 * | 5/2005 | Carnevali | ................. | F16M 11/14 248/160 |
| 2005/0161572 A1 | 7/2005 | Rawlings | | |
| 2005/0205724 A1 * | 9/2005 | Carnevali | .......... | F16M 11/2078 248/122.1 |
| 2005/0205730 A1 * | 9/2005 | Carnevali | ............. | F16M 11/16 248/163.1 |
| 2006/0032417 A1 | 2/2006 | Goschy | | |
| 2008/0087789 A1 * | 4/2008 | Haynes | ................. | F16M 13/00 248/454 |
| 2008/0174947 A1 | 7/2008 | Chang | | |
| 2009/0095854 A1 | 4/2009 | Forbes et al. | | |
| 2010/0012812 A1 | 1/2010 | Hu | | |
| 2010/0294908 A1 * | 11/2010 | Mish | .................... | A47B 23/043 248/451 |
| 2012/0091307 A1 | 4/2012 | Haynes | | |
| 2014/0346306 A1 * | 11/2014 | Mayfield | .............. | F16M 11/041 248/455 |
| 2015/0154891 A1 * | 6/2015 | Baschnagel | ................ | B43L 1/00 40/331 |

OTHER PUBLICATIONS

Final Office Action issued in related U.S. Appl. No. 12/206,397 dated Jan. 10, 2012, 7 pages.
Non-Final Office Action issued in related U.S. Appl. No. 12/206,397 dated Apr. 28, 2010, 9 pages.
Non-Final Office Action issued in related U.S. Appl. No. 12/206,397 dated Mar. 29, 2013, 8 pages.
Notice of Allowance dated Jul. 9, 2020 for U.S. Appl. No. 16/150,660 (pp. 1-9).
Notice of Allowance dated May 5, 2021 for U.S. Appl. No. 29/726,057 (pp. 1-7).
Office Action dated Feb. 18, 2020 for U.S. Appl. No. 16/150,660 (pp. 1-7).
Office Action dated Jan. 4, 2021 for U.S. Appl. No. 29/726,057, 6 pages.
Office Action dated Nov. 27, 2019 for U.S. Appl. No. 16/150,660 (pp. 1-5).

(56) References Cited

OTHER PUBLICATIONS

Notice of Allowance dated Jun. 22, 2023 for related U.S. Appl. No. 29/806,898.

* cited by examiner

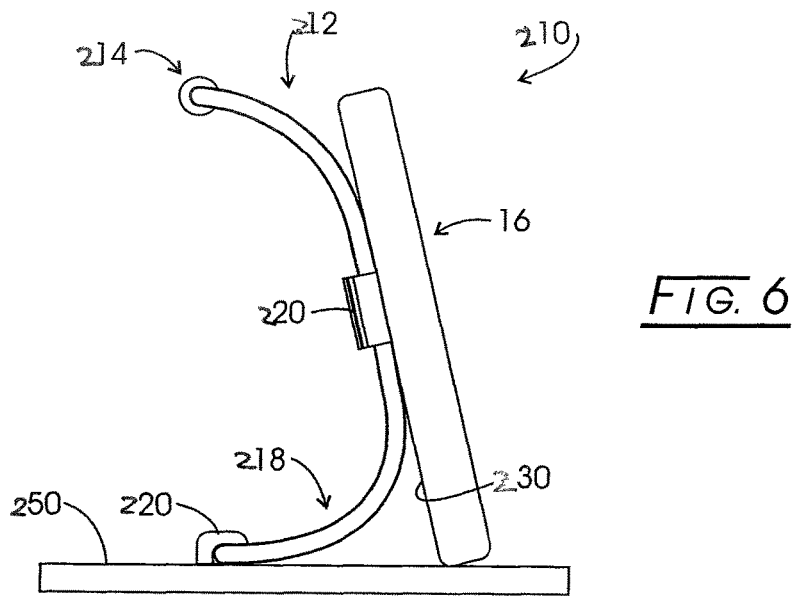
FIG. 6
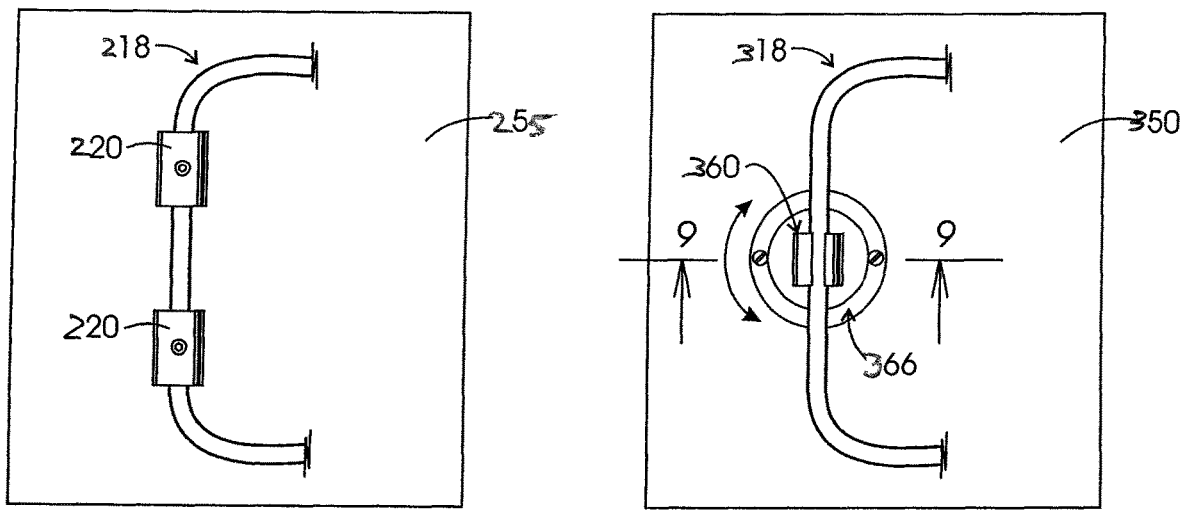
FIG. 7
FIG. 8
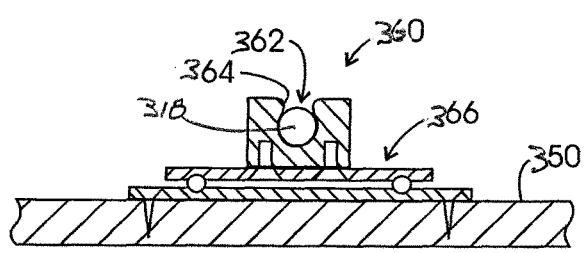
FIG. 9

FORMABLE STAND SYSTEM

CROSS-REFERENCE TO RELATED APPLICATIONS

This application is a continuation of U.S. patent application Ser. No. 16/150,660, filed Oct. 3, 2018, which is a continuation of U.S. patent application Ser. No. 12/206,397, filed Sep. 8, 2008, which claims priority to U.S. Patent Application No. 60/967,660, filed Sep. 6, 2007, all of the above listed applications are herein incorporated by reference.

STATEMENT REGARDING FEDERALLY SPONSORED RESEARCH

Not applicable.

BACKGROUND OF THE INVENTION

There exists a continuing need for supports for electronic and other devices that provide a balance between rigidity, flexibility, adjustability and security. Support systems have been available for many years adapted for use with portable computer such as laptop computers, viewing screen and the like. The existing stands are almost all constructed of rigid materials that are adjusted by cams or the like into a variety of positions.

Handheld devices that provides a means for supporting or carrying the device are well known and include, for instance components such as carrying straps for radios or tape players, support tripods for cameras, belt and pocket clips for music players such as MP3 players or Apple iPods™, along with various supports, such as clips or holsters for cell phones, pagers and PDAs. Personal electronic devices carried and utilized in a variety of environments require effective means to position the devices and to carry those devices while being used and or transported. All current support systems and carry handles are limited by their ability to respond to use in only a limited number of positions and or to a limited range of forces.

A variety of flexible rods or cables are available that have been used to support objects relative to a support. For instance, a number of lighting fixtures have been available for many decades that employ a semi-rigid, positionable conduit that supports a lamp-head in relation to a relatively heavy base. Such lamps are variously known as "gooseneck" lamps and the like, and typically the conduit comprises a spiral wound sheath of steel, aluminum of other material, surrounding a hollow core that provides a passage for wiring. More recently the uses for the variety of flexible conduits has greatly expanded, such that flexible conduits and/or flexible rods are used to direct illumination, for instance, from a microscope illuminator, or a flashlight, as disclosed in U.S. Pat. No. 6,718,136 to Bird et al., or to support a lighting head at a distance from a power supply, for instance, as disclosed in U.S. Pat. No. 5,702,175 to Chen.

Conduit or flexible rod useful for such applications may be constructed to form a hollow cylinder, and the supporting helically wound structure functions as a flexing member, and the flexing member may be further enhanced by encasing the wound tube in a sheath of resilient material, such as rubber, or heat-shrink plastic tubing. Other variations of flexible rods have a solid core of malleable material, along with a protective sheath. In addition, flexible rods are available that are a composite of plastic or other resilient material, and metals, such as stainless steel, or comprised entirely of various resilient, nonmetallic material.

Laptop computers, touchscreen devices and PDAs generally provide some type of support system to allow the devices to be positioned on a limited variety of surfaces with the goal that the device may be easily utilized, controlled, carried. In almost all cases, the support and positioning system is provided so that it is useful for the user of average tactile and motor abilities, in a typical office type of environment. Provision for a support system most useful to the user of average ability in a favorable environment limits the utility of support systems, and the device itself by those using the device in more challenging environments, such as, for instance, a factory floor, a sales floor, field work, waiting areas, on forklifts or with wheelchairs. Moreover, those with differing physical and mental abilities often find existing support systems are inadequate to serve their needs for a more adaptable and flexible support and or carrying system. For instance a palm-type computer such as a PDA or a notebook computer case are easily dislodged from position and/or dropped when using the devices. Moreover, the device often cannot be positioned on a surface for easy viewing by and interaction with the user.

Thus, it is clear that it is often desired for portable electronics to be positioned on a desk, on a swing out table top, in a car, and/or carried securely in the hand of the user. There are a variety of examples of previous attempts to provide for efficient support and positioning of electronic devices such as laptop computers, notebook computers, video screens, and interface terminals.

For example, U.S. Pat. No. 5,235,495 discloses a pen-based computer with handle/prop having ratchet locking mechanism—computer support that includes ratchet locking mechanism with release buttons and handle pieces extending through the interior of the computer case. The stand is adjustable by means of a ratcheting cam, and possesses rigid legs made of a plastic and or metal material.

U.S. Pat. No. 6,301,101 discloses a collapsible, positionable stand for portable computer comprising of a bent wire support stand for a laptop computer that includes means of attachment to the computer and with means for maintaining the computer in an upright position. The wire stand is essentially rigid.

U.S. Patent Publication 2003/0089832 discloses a support for handheld tablet electronics comprising a jointed hinge support apparatus for a personal digital assistant (PDA) or the like, and having hinge leaves receiving a hinge pin unit, supporting knuckle portions configured on hinge leaves.

U.S. Pat. No. 7,180,731 discloses a laptop height adjustable display comprising a computer support coupled to support base, a display component slidably coupled to computer component, and a flexible biasing unit to retain the display component in fixed position relative to the support.

U.S. Pat. No. 5,915,661 discloses a collapsible stand for portable computer—comprises a bent wire support stand for a laptop computer that includes means of attachment to said computer and means of maintaining said computer in an upright position. This wire stand is also essentially rigid.

A number of other patent applications have disclosed support systems that seek to meet the needs of users of electronic devices and demonstrate the continuing attempts to meet these needs. For instance, U.S. Patent Publication 2005/0161572 discloses an adjustable, lockable computer stand. U.S. Design Pat. No. D508,055 discloses a supporting stand for liquid crystal display comprising a stand for an LCD display in an erect position and the stand includes two points of attachment to the LCD. This stand is apparently not positionable and is rigid. U.S. Pat. No. 6,980,426 discloses a monitor stand, and is representative of previous support systems that do not include the features of the embodiments disclosed herein.

In summary, none of the existing support or carrying systems for electronic devices provide the full range of positions that may at times be desired, nor do the existing support systems provide a workable combination of resilience and rigidity desired by users of these devices.

BRIEF SUMMARY OF THE INVENTION

The invention is embodied in a formable support stand system for portable electronic devices that provides a manner to support a device such as a tablet computer in a variety of orientations from a supporting surface such as a tray or table. The embodiments comprise a flex-rod prop, and a fastener for attaching the prop to an electronic device, such that the flex rod resists deformation, but can be adjusted into a wide variety of positions.

A further embodiment is a stand system is adapted for use with devices used by those with limited or erratic motor control, in order to allow positioning of the screen face of a tablet computer in a chosen orientation relative to a support tray on a wheelchair, for instance. The stand is made of a flexible, positionable material, such as a metal flex-rod of about ¼ inch in diameter and has an anti-skid sleeve for reducing slippage of the stand on a surface, thereby increasing the force needed to slide the stand. The flex rod is removeably attached to the electronic device by means of rod clamp, with set screw limiting the slip of the flex rod through the clamp. Other objects of the disclosure of embodiments will, in part, be obvious and will, in part, appear hereinafter.

A further embodiment is a support system for positioning a device at a desired location comprising: an elongated flex-rod body of resilient material, said flex-rod body being capable of being positioned into a variety of differing shapes, one or more attachable flex-rod body clamps for affixing the elongated flex-rod body to the device, whereby the support system provides for positioning the device in relation to a surface. The support system may further comprise a resilient sheath of non-slip material over a portion of the flex-rod body member, therefore providing for enhancement of the friction between the support system and a supporting surface.

In a preferred embodiment, the support system flex-rod body has a diameter from about 0.15 inches to about 0.5 inches, and the flex-rod body can resist from about 0.05 Nm to about 5.0 Nm of deflective force. Most preferably, the support system flex-rod body is about 0.25 inches in diameter can resist deflective force of about (Nm. Also most preferably, the support system flex-rod body is about 0.375 inches in diameter can resist deflective force of about 5 Nm. The flex-rod body is preferably comprised of one or more of a helically wound steel shaft; a helically wound steel shaft encased in a plastic sheath; a semi-rigid plastic rod encased in a foam sheath and a rod or tube of malleable metal alloy.

A further embodiment is a support system as described further comprising a flex-rod handle portion and a flex-rod stand portion, wherein the flex-rod handle portion extends from a first flex-rod clamp to one or more second flex-rod clamps; and the flex-rod stand portion extends from said first flex-rod clamp to one or more second flex-rod clamps, or alternatively wherein the flex-rod body comprises a stand portion.

A further embodiment is of a support system for positioning a device at a desired location comprising: an elongated flex-rod body of resilient material, said flex-rod body being capable of being positioned into a variety of differing shapes; one or more attachable flex-rod body clamps for affixing the elongated flex-rod body to the device; and a resilient sheath over a portion of the flex-rod body providing for enhancement of the friction between the flex-rod body and a supporting surface; wherein the flex-rod body has an exterior diameter from about 0.15 inches to about 0.5 inches and has a deflective resistance from about 0.05 Nm to about 5.0 Nm of deflective force, whereby the support system provides for positioning the device in relation to a surface.

Yet another embodiment is a flex-rod body clamp comprising a clamp body, a clamp channel sized to firmly grip flex-rod body, a lockable set screw through the clamp body for limiting the slip of flex rod body through the clamp body, and an attachment means whereby the flex-rod body clamp may be attached to a case enclosing a device.

Yet another embodiment is for a kit for retrofitting existing devices, providing a flexible, positionable stand for a device comprising a flex-rod body member of resilient material, a flex-rod body member sheath with non-slip characteristics, a flex-rod clamp, an attachment means for affixing the flex-rod clamp to the device and assembly instructions whereby a user can install the support stand to a chosen device. The kit may provide an attachment means that is one or more of an adhesive, an adhesive tape, and a screw.

Finally, another embodiment is for a method for providing an adaptive stand for an electronic device used by those requiring rehabilitation services comprising a.) an elongated flex-rod body of resilient material, said flex-rod body being capable of being positioned into a variety of differing shapes; b.) one or more attachable flex-rod body clamps for affixing the elongated flex-rod body to the device; c.) whereby the flex-rod body is of sufficient resilience to support the device with stability sufficient to utilize a touch screen without altering the position of said device; and d.) the flex-rod body is of sufficient flexibility so as to be positionable by an individual with limited manual dexterity.

The instant presentation, accordingly, comprises embodiments of the apparatus and method possessing the construction, combination of elements, arrangement of parts and steps which are exemplified in the following detailed disclosure.

BRIEF DESCRIPTION OF THE DRAWINGS

FIG. 6 shows a side view of the support assembly attached to a tabletop;

FIG. 7 shows an alternative embodiment of the attachment of the stand assembly to a table top;

FIG. 8 shows an alternative embodiment, wherein the support assembly is attached to a table by a snap swivel clamp; and FIG. 9 shows a cross section side view of the snap swivel clamp.

DETAILED DESCRIPTION OF THE INVENTION

The availability of computers and other electronic equipment has provided a welcomed enhancement of the quality of life for those whose access is limited by permanent or temporary disability. Assistive technologies have increasingly become available, including such devices as adaptive computer access products, environmental control systems and voice output devices. These assistive technologies have allowed those with physical and/or mental challenges to engage in previously inaccessible educational, vocational and daily care activities.

An embodiment disclosed herein is a formable support stand system for portable electronic devices that provides a manner to support a device such as a tablet computer in a variety of orientations from a supporting surface such as a tray or table. The formable support stand system is adjustable to a nearly infinite number of positions, and the flexible stand and flexible handle embodied herein allow the user to position the supported device into a chosen positions for any situation. Due to the flexibility of the support system, the user is relieved from cumbersome adjustments required with previous support stands that provide only a limited number of fixed positions, and utilize components that are nearly rigid, or at the least only positionable at a few selected locations, with the positions available being predetermined by the manufacturer of the stand. Thus, enhanced ability to position the device during use is provided, and the user is also may be provided with a handle and or carry system that is similarly flexibly positionable at the option of the user.

Figure 1:
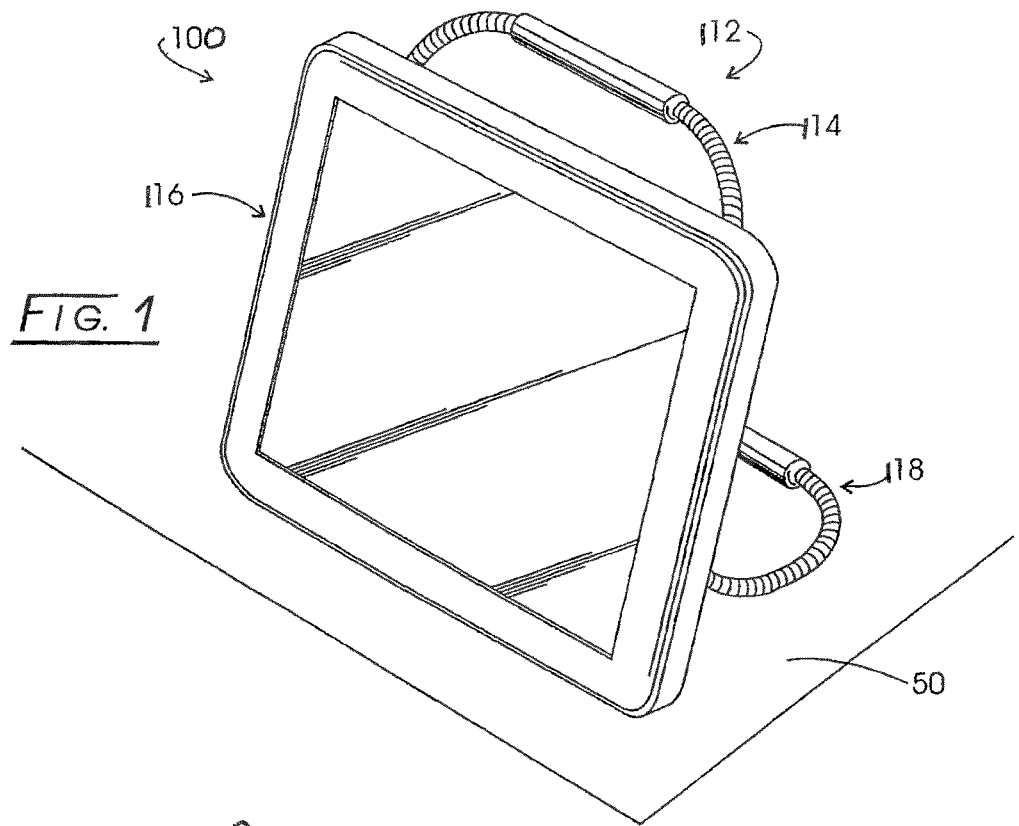
FIG. 1 shows a front perspective view of the formable support assembly affixed to a notebook computer.
Figure 2:
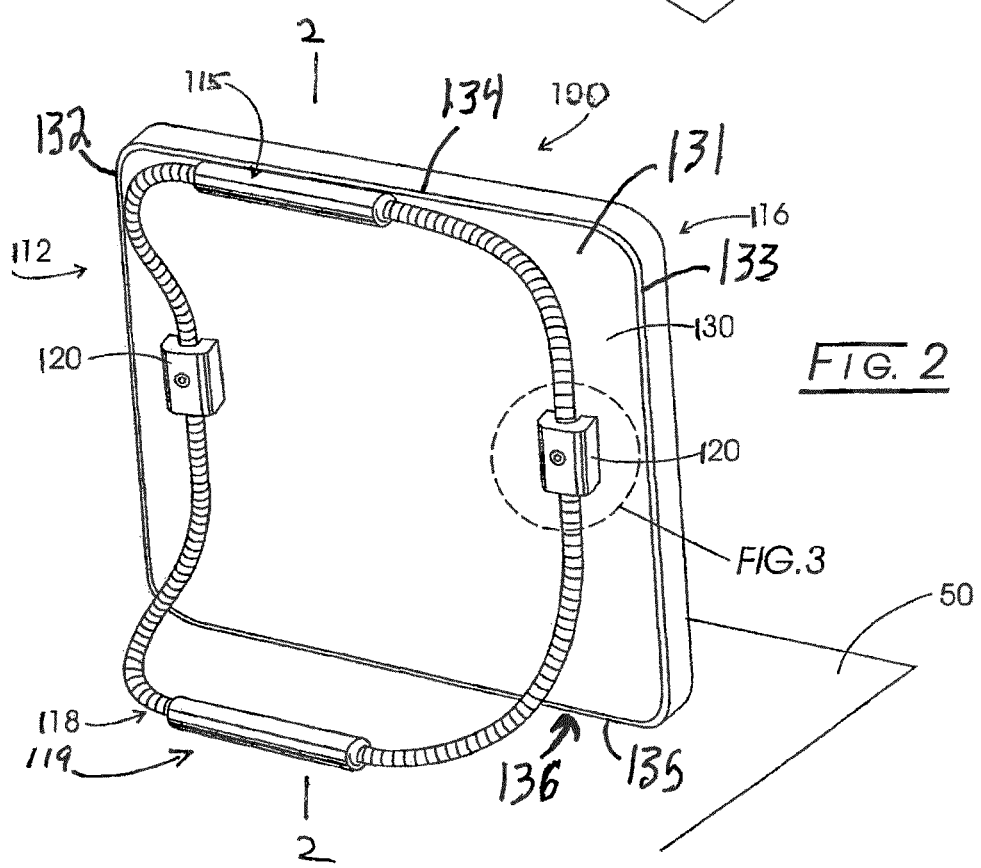
FIG. 2 shows a back perspective view of the formable support assembly affixed to a notebook computer.

As is shown in FIG. 1, the formable support stand system, shown generally at 100, is preferably applied to an electronic device, 116, such as a video screen, tablet computer or other portable computer interface. The formable support stand 100 is shown supporting the device 116 in a user chosen position while resting on table surface 50. Support stand 100 as embodied in FIGS. 1 and 2 is comprised of a flex-rod body 112, with support stand handle portion 114 and support stand prop leg portion 118. Referring now to FIG. 2, showing the back side of device 116 upon which the formable support stand system is mounted, the flex rod body 112, as shown in FIGS. 1 and 2, forms a loop from a given length of flex-rod body material, with two ends of the flex-rod connected by a connector sleeve. One or more flex rod clamps 120 physically attach the flex rod body to case 130 of device 116. The stand is approximately symmetrical about axis 2-2, with the support stand handle portion 114 and the support stand prop leg portion 118 being optionally of different sizes, allowing the upper portion to be proportionally smaller, to function as a handle, and the lower portion, as a stand prop leg. The two ends of a linear flex-rod body many be connected underneath sleeve 115 or 119, or alternatively, within the confines of flex-rod clamp 120. It is also apparent that the flex-rod body itself may easily be formed from 1, 2, 3, or 4 lengths of flex-rod body material, and the outward appearance of the support system will not be altered, so long as connection of the additional lengths of flex-rod body are made within sleeves 115, 119 and/or clamp(s) 120.

An advantage of the support stand is that the flex rod can be sized to resist a given deflection load, such as might be delivered by spastic movements, yet not be so rigid as to be difficult to position or to fail to yield under a potentially damaging force.

The stand system is adapted for use with devices used by those with limited or erratic motor control, in order to allow positioning of the screen face of a tablet computer in a chosen orientation relative to a support tray on a wheelchair, for instance. The formable support stand system 112 as shown in FIG. 1 is made of a flexible, positionable material, such as a metal flex rod of about ¼ inch in diameter. Flex-rod body material is available from a variety of suppliers, including VIMCO Inc, Java Center, N.Y., USA. An advantage of the support stand is that the flex rod can be sized to resist a given deflection load, such as might be delivered by spastic movements, yet not be so rigid as to be difficult to position or to fail to yield under a potentially damaging force. As shown in FIGS. 1 and 2, support stand 112, is provided with sleeves 115 and 119, such sleeves being preferably embodied as an anti-skid sleeve for reducing slippage of the stand on a surface, thereby increasing the force needed to slide the stand.

The flex rod body 112, in a preferred embodiment is removeably attached to the electronic device by means of flex-rod clamp 120. As shown in a detail view of FIG. 3, flex-rod clamp 120 is attachable to case 130. Flex-rod body clamp 120 is formed with clamp channel 128, which is sized to firmly grip flex-rod body 112 when the clamp 120 is attached to case 130. In one embodiment of the support system, flex-rod clamp 120 fixes flex rod body 112 in position when flex-rod clamp 120 is attached to case 130, such that the flex-rod body does not slide through clamp 130. A set screw 126 may be provided for limiting the slip of flex rod body 112 through clamp 120. In an alternative embodiment, sufficient clearance may be provided to allow flex-rod body 112 to slide though clamp 120, only when significant longitudinal force is applied, to allow adjustment of the position of the flex-rod body, yet not result in inadvertent slippage during use. Moreover, set screw 126 may useful for locking the flex-rod body in position, yet may be loosened for adjustment.

In an embodiment, the case 130 has a rear side 131 with a right edge 132, left edge 133, top edge 134, and a bottom portion 136 having a bottom edge 135. A flex-rod clamp 120 is attached to the rear side 131. The flex-rod body 112 has an end clamped in the flex-rod clamp 120. The flex-rod body 112 is capable of being positioned into a variety of differing shapes. The flex-rod body 112 extends from the end clamped in the flex-rod clamp 120. In some embodiments, the flex-rod body 112 and the bottom edge 135 of the bottom portion 136 are configured to both contact a supporting surface 255, such as a tray, table top 250, or table surface 50, when the portable electronic device is resting on the supporting surface 255.

Figure 4:
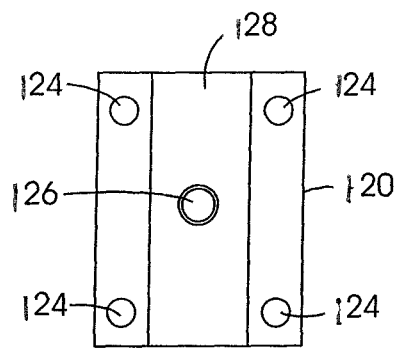
FIG. 4 shows a bottom view of a flex-rod body clamp.

FIG. 4 shows a bottom detail of clamp 120, with clamp 120 being affixable to case 130 or other support surface by means of screws passing through case 130 driven into threaded holes 24, and allowing for insertion of set screw 126 in another threaded hole located at the apex of channel 128.

Figure 3:
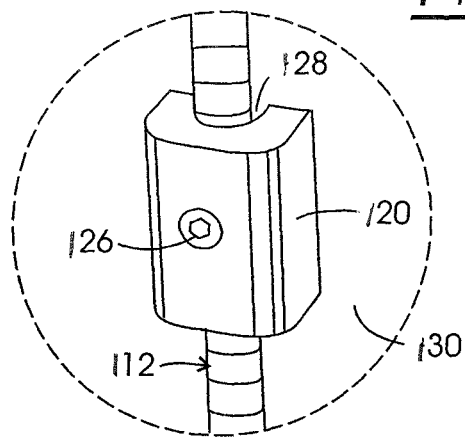
FIG. 3 shows detail view of a flex-rod body clamp.

FIG. 3 shows another variation of the flex rod prop assembly, wherein stand 40 is affixed to supporting device 42 by blind stand clamp 44. Stand 40 consists only of lower stand portion 46, functioning as a stand leg.

Figure 5:
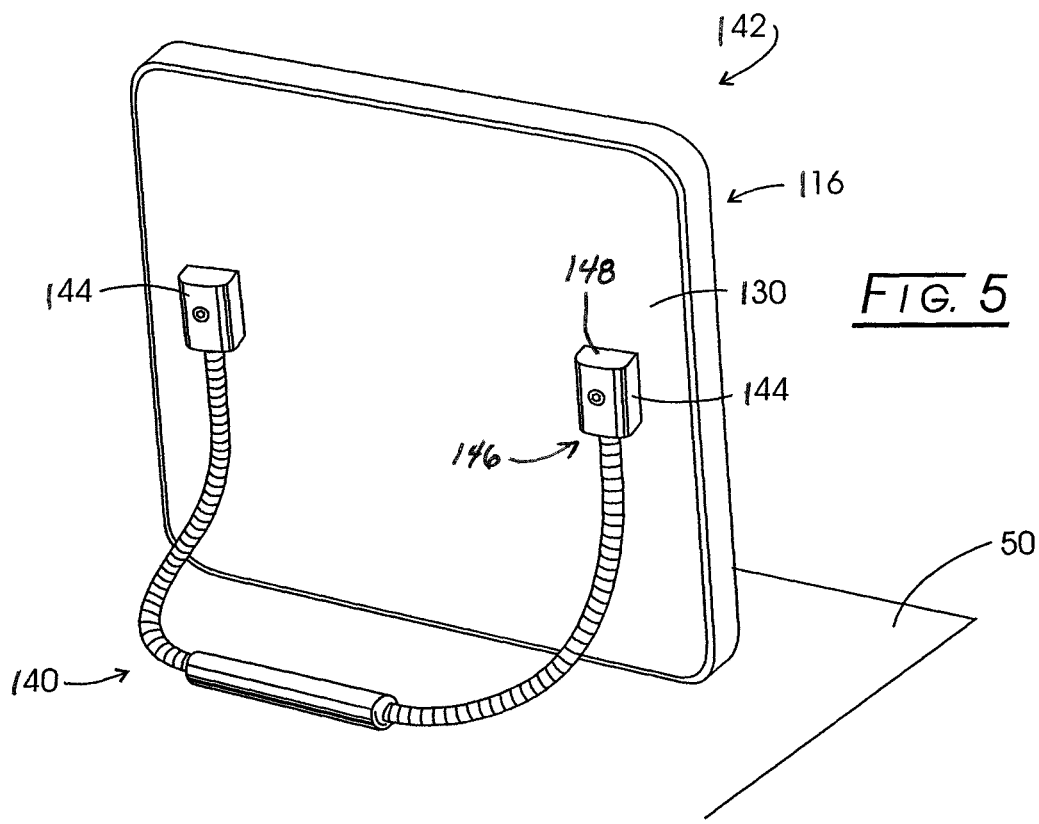
FIG. 5 shows a rear perspective view of the formable support assembly embodied as a stand.

In FIG. 5 is shown an alternative embodiment of the apparatus. In this variation of the flex rod prop assembly 142, according to the formable support assembly, the apparatus is configured with a support stand prop leg 140 (and no support stand handle portion). The stand prop leg is affixed to the supported device 116 by a blind stand clamp 144, with this variation consisting only of lower support stand prop leg portion, analogous to support stand prop leg portion 118, functioning as a stand prop leg. In this embodiment, clamp 120 could be utilized, however, in clamp 144, clamp channel 128, as in clamp 120, does not pass though clamp 140, but blind channel 146 terminates at blind end 148.

Those skilled in the art of mechanical engineering will recognize that clamps 120 and 140 may be attached to a device case 116 by a variety of attachments. For instance, in addition to the screws discussed previously, adhesives, glues, foam tape, epoxies, snap studs, or the like may be utilized. In a preferred embodiment, the apparatus is supplied as a kit for providing the support system to an electronic device not provided with a suitable support system. As such the kit would include one or more of a flex-rod body member, a flex-rod clamp, a sleeve, and an attachment means. In addition, necessary tools, assembly directions, and adhesives may be provided as part of the kit. Thus, an end user could employ the kit as described to affix the formable support stand to a chosen device, and utilize the support stand with an existing device.

The formable support system is further embodied in an assembly, as shown in FIG. 6 in a side view, generally at 210, that provides for affixing the support system to another body, such as a table top 250. Flex rod body 212 is affixed to case 230 of device 216 utilizing flex-rod body clamps 220. Flex rod body clamps 220 may be formed as are clamps 120, or in other configuration to accomplish that same result. Flex-rod body handle portion 214, is free to be grasped by a user, while flex-rod body prop leg portion 218, is attached to table 250 by one or more clamps 220. Table 250 is further embodied as a tray, for instance as a tray utilized with a wheelchair, hospital bed, or work station. FIG. 7 shows a top view of a flex-rod body prop leg portion 218 affixed to a surface 255, such as a tray, by means of two flex-rod body clamps 220.

While flex-rod body clamps 220 may be removeably attachable by means of screws, for instance, in an alternative embodiment, flex rod body clamp 220 is configured with a channel that provides for a snap clamp for attaching flex rod body prop leg to a surface. As shown in FIGS. 8 and 9 flex rod body clamp 360 is configured with an outwardly disposed channel 362 providing a clamp for attaching flex rod body prop leg 318 to surface 350. Further, swivel base 366, allows the flex rod body member snapped into clamp 360 to be rotated about an axis, to provide secure and adaptable positioning of a device. Referring to FIG. 9, a cross section along line 9-9 is shown. Clamp 360 is attached to swivel base 366, and thereby to surface 350. Channel 362 of clamp 360 can accept entry of flex-rod body member 318, and be retained within channel 362 by detents 364. Clamp 360 may be formed of a resilient material to allow deformation of the channel 362, and passage of body member 318, where it is retained in the confines of the channel by relaxation into position of detents 364.

The positionable support system embodied herein is further embodied in a flex-rod prop assembly where the flex rod body member is at least partially covered with a resilient material that increases the friction between the support assembly and the surface supporting the device. Thus, when the flex rod body is constructed of a material, such as polished aluminum or other metal, and has a relatively low coefficient of friction when placed upon a flat surface such as a common table top, at least partially covering or coating flex rod body with a resilient material such as rubber or closed cell PE foam will enhance the friction between the flex-rod structure and the underlying support, i.e. a smooth table. Thereby, due to the enhanced friction provided, the device to which the support system is affixed will not inadvertently or unintentionally slide or slip along the support. Moreover, the enhanced friction between the flex-rod body and the supporting surface will allow the support assembly to effectively maintain the user chosen position of the supported device.

The resilient sheath component of covering a portion of the flex-rod body member is envisioned to alternatively completely ensheath, for instance approximately 10%, 25%, or 50% of the flex-rod body member. In such embodiments, the resilient sheath component is a non-skid friction pad, for instance, a tubular segment of closed cell foam or rubber. The non-skid friction pad may be constructed to cover one continuous section of the flex-rod body member, or alternatively, two or more shorter segments of a given flex-rod body member. In another embodiment, the non-skid pad may be configured to removeably snap over the flex-rod body member, and be positionable along the body member. Another embodiment of the friction enhancing resilient sheath is a coating, such as a paint, or rubber coating that coats the entire flex-rod body member, or only that portion of the flex-rod body member that is expected to contact the support surface. Other examples of the friction enhancing (i.e. non-slip) sheath include a heat shrinkable plastic sheath over the entire flex-rod body, spray-on foam coating, foam of polypropylene, polyethylene, polybutylene or other resilient materials known to artisans. that provides for enhance the friction between the support system and the supporting surface. that of the flex rod body member.

The flex-rod body 112 of FIG. 2, in a preferred embodiment has a helical member 200, which provides a given amount of support, in that the helical body member 200 is stable, unless a given amount of force is applied to displace said helical body member, and is capable of elastically deforming under a wide range of bending displacements and adjustments, displaying plasticity properties that allow the flex-rod body to substantially hold a given deformed shape once positioned by the force necessary for displacement. In addition to the helical body member, the flex-rod as embodied herein, may provide for a solid core member, with the core member being made of one or more malleable metals, carbon fiber, fiberglass, plastic or plastic type materials, or other material familiar to those skilled in the art.

The flex-rod as embodied by the disclosure, may also provide a sheath member, with the sheath member serving to encase one or more flex-rod body members, and provide additional desirable properties for the flex-rod support stand. For example, a sheath member, such as shown in FIG. 2 at 115 may partially enclose the flex-rod body, or may be extended to entirely ensheath the flex-rod body. The sheath member will typically formed from plastic, or plastic-type materials such as polyethylene, polyvinylchloride (PVC), flourinated ethylene-propylene (FEP), open cell plastic foam, closed cell foam such as cellular polyethylene and foam FEP, along with FEP Teflon, and cellular FEP Teflon.

Additional types of commercially available flexible rods may be utilized according to the embodiments herein, including rod-like open spirals, rod-like open metal or plastic spirals, encased in a sheath, foam or plastic rods with a malleable metal core, or foam or plastic rods with a core of composite materials. Thus, it is apparent that the exact structure of the flex-rod for use according to the embodiments herein is not critical, so long as the flex-rod provides a deformable, positionable supporting structure, with the supporting structure responding to a predictable force for deformation, and retaining its shape until sufficient force for deformation is again provided to rearrange the position of the flex-rod. Moreover, the flex-rod as embodied herein should possess sufficient [resilience] that the flex-rod may be repeatedly deformed and repositioned without causing failure of the flex-rod structure due to fatigue or impact. For further discussion of flexible support rods, see, for example, U.S. Pat. No. 5,702,175 to Chen, that discloses a portable, positionable lamp device that utilizes a flexible rod type support for the lamp head. U.S. Pat. No. 5,276,596 to Krenzel discloses a support system for a flashlight, utilizing a different type of flexible rod.

Certain clamping systems are known to allow clamping of a rod shaped body to a supporting platform. For instance, U.S. Pat. No. 3,430,903 discloses a clamp for holding down cables or the like; European patent No. EP 1795134 discloses a polyaxial screw for flexible rod—comprises a flexible rod made of an elastic material and allows a polyaxial adjustment of the position of the anchoring element relative to the rod; U.S. Pat. No. 5,223,675 discloses a cable fastener, for holding a flexible "tube" to a surface; U.S. Design Pat. No. D516,415 discloses ornamental aspects of a conduit support, with two legs.

"Plastic" for purposes of this disclosure means the tendency of a material to remain in a displaced configuration subsequent to a displacement from an initial configuration. Small bending displacements do not result in plastic deformation of a body, as the flexible body has a memory to restore the body to substantially the same position as prior to the small displacement. Large bending displacements of a body according to the present invention do result in residual deformation of the body. The flex-rod support stand may be plastically deformed by the displacement force, and once displaced, remains substantially in the resulting deformed shape.

Thus, it will be apparent, that a variety of structures in addition to those disclosed herein are capable of providing the functionality of the flex-rod support. A variety of modifications and adaptations may be easily accomplished by those skilled in the art without undue experimentation in accordance with the present disclosure.

As known is known to those skilled in the arts of physics and engineering, the ability of a support member to resist bending, i.e., transverse bending, is governed by a section modulus, symbolized by the term EI. A given section modulus EI results from a number of variables, including the combined Young's Modulus (E), and Moment of Inertia (I), of a given the section of material. The flex-rod body, as disclosed, preferably is chosen to balance the desire for adjustability with the need for moderate rigidity, in order to provide useful support. As such, helically wound steel flex-rod is useful for such purposes. For instance, one embodiment employs flex-rod of about 0.1875 inches in diameter. Such flex-rod is capable of supporting a weight of 0.6 ounces extended horizontally at 12 inches without yielding. Thus, the torque required to deflect the 0.1875 inch diameter flex-rod is equivalent to about 0.04 foot pounds. Similarly, a 0.25" flex-rod, as employed herein can support 3.2 ounces at a 12 inch extension, and a 0.375 inch diameter flex-rod can support 6.0 ounces at a 12 inch extension, i.e. resist forces of about 0.2 and 0.4 foot pounds (ft. lbs.) respectively. The metric equivalent of these forces is from about 0.05 Nm, 0.5 Nm and 5.0 Nm respectively. As defined herein deflective force is measured as the ability of a support member and or flex-rod body to resist deformation, as measured by a 12 inch extended length of flex-rod body held horizontally, force applied to that 12 inch horizontal length. Deflective force may therefore be stated as in foot pounds (ft. lbs.), inch pounds (in. lbs.) and or Newton meters (Nm).

The flex-rod body as disclosed herein preferably resists deformation from deflective forces of less than about 0.6 ounces to 6.0 ounces per 12 inch extended length, and yields to forces from about 0.6 ounces to about 6 ounces per 12 inch extended length. The particular torque forces placed on a flex-rod support stand are rather complex, as when embodied herein, the flex-rod functions as an arch, and is displaced at an angle to the body of the supported device. Thus, the rigidity and deformability of the flex-rod chosen for use with the system is typically determined experimentally, rather than by straightforward calculation of the forces imposed. Nonetheless, flex-rod cable of resisting the equivalent of 0.05 Nm to about 5.0 Nm of deflective force may be used with the embodiments herein disclosed, in consideration of the size and application of device being supported.

In preferred embodiments the flex-rod body is from about 0.15 inches to about 0.5 inches and has a deflective resistance from about 0.05 Nm to about 5.0 Nm of deflective force, thereby allowing the support system to provides for reliable positioning the device in relation to a surface. Particularly preferred embodiments include a flex-rod body of about 0.25 inches in diameter, with a deflective resistance of about 0.5 Nm, and a flex-rod body of about 0.375 inches in diameter with a deflective resistance of about 5 Nm.

As described previously, an advantage of the support stand is that the flex rod can be sized to resist a given deflection load. Stands for use with individuals who are unable to deliver significant forces for repositioning would in some applications be drawn to employ flex-rod that was only nominally greater than the rigidity needed to support the supported device. Stands as embodied herein that are designed to cushion shock forces, and to be utilized in difficult environments, such as a factory floor or in the field, would in some applications preferably be much greater than the rigidity necessary to support a given device.

The combination of materials used in forming the flex-rod body are provided to prevent premature failure of the flex-rod due to repetitive strain fatigue, and or as a result of bending the flex-rod to a radius to sharp for the flex-rod to retain its plasticity. For instance the core member may be embodied to resist bending to a minimum radius that exceeds the failure radius of the flex-rod body member.

Since certain changes may be made in the above apparatus and method without departing from the scope of the disclosure herein involved, it is intended that all matter contained in the above description or shown in the accompanying drawings shall be interpreted as illustrative and not in a limiting sense. All citations are herby incorporated by reference.

The invention claimed is:

1. A portable electronic device comprising:
 said portable electronic device;
 a case for said portable electronic device;
 said case having a rear side and a bottom edge; a flex-rod clamp attached to said rear side;
 a flex-rod body having an end clamped in said flex-rod clamp;
 said flex-rod body is capable of being positioned into a variety of differing shapes;
 said flex-rod body extending from said end clamped in said flex-rod clamp;
 wherein said flex-rod body and said bottom edge are configured to both contact a supporting surface, when said portable electronic device is resting on said supporting surface.

2. The portable electronic device of claim 1, wherein said flex-rod body is comprised of a handle portion and/or a prop leg portion.

3. The portable electronic device of claim 1, wherein said flex-rod body has an exterior diameter from about 0.15 inches to about 0.5 inches and has a deflective resistance from about 0.05 Nm to about 5.0 Nm of deflective force.

4. The portable electronic device of claim 3, wherein said exterior diameter of said flex-rod body is more than about 0.25 inches.

5. The portable electronic device of claim 3, wherein said exterior diameter of said flex-rod body is less than about 0.5 inches.

6. The portable electronic device of claim 3, wherein said flex-rod body has a deflective resistance of more than about 0.5 Nm.

7. The portable electronic device of claim 3, wherein said flex-rod body has a deflective resistance of less than about 5 Nm.

8. The portable electronic device of claim 1, wherein said flex-rod clamp is further comprised of a clamp body, said clamp body having a clamp channel sized to firmly grip said flex-rod body.

9. The portable electronic device of claim 8, wherein said clamp body is comprised of a lockable set screw through said clamp body for limiting a slip of said flex rod body through said clamp body.

10. The portable electronic device of claim 1, wherein said flex-rod body is further comprised of a resilient sheath over a portion of said flex-rod body providing for enhancement of a friction between said flex-rod body and said supporting surface.

11. The portable electronic device of claim 10, wherein said resilient sheath covers about 10%, about 20%, or about 50% of said flex-rod body;
and/or
wherein said resilient sheath covers one continuous section of said flex-rod body;
and/or
said sheath covers two or more segments of said flex-rod body.

12. The portable electronic device of claim 10, wherein said resilient sheath is comprised of paint, rubber, plastic, heat shrinkable plastic, spray-on foam, foam of polypropylene, polyethylene, polybutylene, polyvinylchloride, fluorinated ethylene-propylene, open cell plastic foam, closed cell foam, cellular polyethylene, foam fluorinated ethylene-propylene, fluorinated ethylene-propylene Teflon, and/or cellular fluorinated ethylenepropylene Teflon.

13. The portable electronic device of claim 1, wherein said flex-rod clamp is attached to said case using one or more of an adhesive, an adhesive tape, and/or a screw.

14. The portable electronic device of claim 1, wherein the flex-rod body is comprised of one or more of a helically wound steel shaft, a helically wound steel shaft encased in a plastic sheath, a helically wound steel shaft encased in a resilient sheath, a semi-rigid plastic rod encased in a foam sheath, a rod of malleable metal alloy, and/or a tube of malleable metal alloy.

15. The portable electronic device of claim 1, wherein said flex-rod body is formed from 1-4 lengths of flex-rod body material.

16. A portable electronic device comprising:
said portable electronic device;
a case for said portable electronic device;
said case having a rear side and a bottom portion;
a flex-rod body having at least one end non-rotatably attached to said rear side of said case;
said flex-rod body is deformable into a variety of shapes by a user while having a rigidity to support the portable electronic device;
wherein said flex-rod body and said bottom portion are configured to both contact a supporting surface, when said portable electronic device is resting on said supporting surface.

17. The portable electronic device of claim 16, wherein said flex-rod body is comprised of a handle portion and/or a prop leg portion.

18. A portable electronic device comprising:
said portable electronic device;
a case for said portable electronic device;
said case having a rear side and a bottom portion;
a flex-rod body having at least one end attached to said rear side of said case;
said flex-rod body is capable of being positioned into a variety of differing shapes;
wherein said flex-rod body and said bottom portion are configured to both contact a supporting surface, when said portable electronic device is resting on said supporting surface;
wherein said flex-rod body is attached to said rear side of said case using a flex-rod clamp, said flex-rod clamp is further comprised of a clamp body, said clamp body having a clamp channel sized to firmly grip said flex-rod body.

19. The portable electronic device of claim 18, wherein said clamp body is comprised of a lockable set screw through said clamp body for limiting a slip of said flex rod body through said clamp body.

20. A case for a portable electronic device comprising:
said case having a rear side and a bottom portion;
a flex-rod body having at least one end non-rotatably fixed to said rear side of said case;
said flex-rod body is plastically deformable into a variety of shapes by a user while having a rigidity to support the portable electronic;
wherein said flex-rod body and said bottom portion are configured to both contact a supporting surface, when said case is resting on said supporting surface.

* * * * *